3,308,169
PROCESS FOR FORMING OPTICALLY
ACTIVE MENTHOL
Daniel Lerner, Clifton, N.J., and Basilio Pispisa, Naples, Italy, assignors to Colgate-Palmolive Company, New York, N.Y., a corporation of Delaware
No Drawing. Filed Oct. 17, 1963, Ser. No. 317,028
4 Claims. (Cl. 260—631)

This invention has to do with forming compounds differing in optical activity by use of an optically active solvent used in the preparation of the said compounds. In this way, the formation of an optically active compound is selectively induced.

By way of illustration, racemic menthol can be prepared by means of a two-stage process. In the initial stage, an inexpensive hydrocarbon such as limonene or dipentene is contacted in the presence of a transition metal axide catalyst at 250° C.–350° C. whereupon the charge material is converted to 3-p-menthene. In the second stage of the process, the menthene is reacted with diborane in the presence of ethyl ether solvent at a temperature between about 0° C. and about —70° C., and the borane complex so formed is then reacted (deborated) with alkaline hydrogen peroxide in the presence of a solvent. The solvent has generally been ethyl ether in the deboration operation. The resulting product from this synthesis is a mixture of menthols, commonly referred to as racemic menthol. It has now been found that the use of an optically active solvent in place of ethyl ether or other solvents earlier used, aids in selectively forming the desired reaction product. Instead of racemic menthol being produced, laevo- or dextro-menthol can be formed in much larger concentration than in a racemic menthol mixture, by utilizing a suitable optically active solvent in the preparation.

It is an object of this invention, therefore, to form compounds differing in optical activity in a reaction system in the presence of an optically active solvent, thereby selectively inducing the formation of one optically active compound. It is another object of the invention to provide a process in which organic optical antipodes are formed and in which one of the optically active compounds predominates. A more particular object of the invention is to provide for a synthesis for menthols in which an optically active menthol is formed in larger yield than is found in a racemic menthol product. A more particular object of the invention is to conduct the boration of a compound and hydration of a boron complex, in the presence of an optically active solvent. Additional objects will be apparent from the following description.

The foregoing objects are realized by conducting a reaction system for the preparation of optically active compounds differing in optical activity, in the presence of an optically active solvent.

The invention is illustrated by the preparation of menthols whereby a laevo- or a dextro-rotary menthol is formed in greater concentration than is normally formed and found in a racemic menthol product. Hereinafter, the invention is described in terms of the preparation of menthols, although the invention is in no sense to be considered limited to such a preparation or reaction system. For example, any mono-unsaturated compound which contains an asymmetric carbon atom, or which can be hydrated in such a manner that an asymmetric carbon is formed, can be influenced by the process of this invention. Examples are alpha-thujene, camphene and alpha pinene.

Solvents used herein are optically active and free from groups reactive with compounds employed in preparing the desired optically active compounds. Ethers are a group of such solvents, and are particularly advantageous in boration of a compound with diborane. Typical ethers are those of optically active amyl alcohol (2-methylbutanol-1) and methyl, ethyl, propyl, isopropyl and higher alcohols; the diamyl ether of the said optically active amyl alcohol; ethers of optically active borneol, 1-neothujyl alcohol, etc. and methyl, ethyl, propyl, isopropyl, 2-methylbuatnol-1 and higher alcohols. Particularly preferred, however, for use in preparing menthols from limonene or dipentene and diborane, as outlined above, is 1-menthylethyl ether.

Conditions under which the optically active solvent is used are generally the same conditions as those used with ethyl ether and other known solvents. It will be recognized, however, that should a viscous optically active solvent be used, it will generally be advisable to increase the temperature of the reaction several degrees Centigrade, or some ethyl ether could be included in order to reduce the viscosity of the optically active ether solvent.

The invention is illustrated hereinafter, but not limited to, the following representative example.

*Example 1*

(A) An optically active ether, 1-menthyl-ethyl ether, is prepared by adding 16 grams of sodium to 150 ml. of dried distilled xylene, and the resulting mixture is heated until the sodum is melted. The mixture is agitated and cooled. Sodium is recovered as a powder and is washed free of xylene by two 100 ml. washes of sodium dried ether. To the 16 grams of sodium powder in 100 ml. of ether is added a solution of 108 grams of pure 1-menthol in 100 ml. of dried ether. The mixture so formed is refluxed overnight. Then, 66 grams of ethyl bromide is added, while the mixture is agitated. The ethyl bromide mixture is reacted for 12–18 hours, and ethyl ether is then removed by distillation. The product is refluxed with excess sodium to remove any uncombined menthol. The desired product, 1 menthyl-ethyl ether, is removed by distillation.

(B) To 50 ml. of the 1-menthyl-ethyl ether is added 13.6 grams of 3-p-menthene and the mixture is cooled to 0° C. Diborane is generated by adding 2.6 grams of sodium borohydride in diethyleneglycoldimethyl ether to 15 grams boron trifluoride etherate in the same solvent. The diborane is bubbled into the 3-p-menthene-1-menthyl-ethyl ether solution for two hours. After the resulting mixture has been allowed to stand for one hour, several small pieces of ice are added, followed in turn, by 30 ml. of 3 molar sodium hydroxide and 20 ml. of 30 percent hydrogen peroxide. When reaction has subsided, the mixture is heated to 70° C. to complete the reaction. After extraction with ether and removal of solvents, the optically active menthol is separated from the product. It is found that the product contains 1-menthol in much higher concentration than is found in a racemic menthol reaction product.

The process described above provides a means for preparing optically active compounds which have much greater economic value than racemic mixtures of the same. The optically active solvent is not altered during the reaction and can be recovered and reused.

The present invention has been described with reference to the illustrative example and conditions; however, it will be appreciated by those skilled in the art that other variations and modifications of this invention can be employed, without departing from the principle thereof. Thus, it will be understood that the invention is not limited to the particular compounds set forth in the illustrative discussion. It is intended in the appended claims to cover all such variations and modifications.

We claim:

1. A process for forming menthol rich in one optical antipode thereof which comprises reacting 3-p-menthene with diborane in the presence of an optically active ether solvent to form a boron complex of said 3-p-menthene, and hydrating said boron complex with alkali and hydrogen peroxide to form a mixture of menthol antipodes in which one antipode is present in a concentration greater than that at which it occurs in racemic menthol.

2. The process defined by claim 1 wherein the optically active solvent is 1-menthyl-ethyl ether.

3. A process for forming menthol rich in one optical antipode thereof which comprises reacting 3-p-menthene with diborane in the presence of an optically active ether solvent to form a boron complex of said 3-p-menthene, and hydrating the said boron complex with alkali and hydrogen peroxide in the presence of said solvent to form a mixture of menthol antipodes in which one antipode is present in a concentration greater than that at which it occurs in racemic menthol.

4. The process defined by claim 3 wherein the optically active solvent is 1-menthyl-ethyl ether.

References Cited by the Examiner

UNITED STATES PATENTS

| | | | |
|---|---|---|---|
| 2,958,713 | 11/1960 | Bottoms | 260—675.5 X |
| 3,060,244 | 10/1962 | Saegbarth | 260—606.5 X |
| 3,078,316 | 2/1963 | Bottoms | 260—631 |

OTHER REFERENCES

Wetherill, J. Org. Chem., vol. 22, pp. 1136–7, September 1957.

LEON ZITVER, *Primary Examiner.*

D. D. HORWITZ, *Examiner.*

D. P. CLARKE, T. G. DILLAHUNTY,
*Assistant Examiners.*